(12) United States Patent
Zhang et al.

(10) Patent No.: US 8,494,297 B2
(45) Date of Patent: Jul. 23, 2013

(54) AUTOMATIC DETECTION AND MAPPING OF SYMMETRIES IN AN IMAGE

(75) Inventors: Hui Zhang, Saint Louis, MO (US); Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1219 days.

(21) Appl. No.: 11/697,189

(22) Filed: Apr. 5, 2007

(65) Prior Publication Data

US 2008/0247660 A1  Oct. 9, 2008

(51) Int. Cl.
*G06K 9/40* (2006.01)
(52) U.S. Cl.
USPC .......................................................... 382/254
(58) Field of Classification Search
USPC .................. 382/100, 115, 118, 128, 173, 276, 382/132, 186, 196, 254
See application file for complete search history.

(56) References Cited

U.S. PATENT DOCUMENTS

| | | | |
|---|---|---|---|
| 5,030,984 A * | 7/1991 | Buckler et al. ................ | 396/153 |
| 5,239,596 A | 8/1993 | Mahoney | |
| 5,253,050 A | 10/1993 | Karasudani | |
| 5,274,469 A * | 12/1993 | Small et al. .................... | 358/445 |
| 5,303,019 A | 4/1994 | Irie | |
| 5,432,712 A * | 7/1995 | Chan .............................. | 382/191 |
| 5,515,447 A | 5/1996 | Zheng et al. | |
| 5,533,143 A * | 7/1996 | Takeo ............................. | 382/132 |
| 5,916,449 A * | 6/1999 | Ellwart et al. .................. | 210/745 |
| 6,263,097 B1 * | 7/2001 | Dewaele ........................ | 382/132 |
| 6,591,011 B1 | 7/2003 | Nielsen | |
| 6,711,293 B1 | 3/2004 | Lowe | |
| 6,735,745 B2 | 5/2004 | Sarig | |
| 6,754,367 B1 | 6/2004 | Ito et al. | |
| 7,426,287 B2 * | 9/2008 | Yoon et al. .................... | 382/118 |
| 7,668,376 B2 * | 2/2010 | Lin et al. ....................... | 382/190 |
| 7,676,087 B2 * | 3/2010 | Dhua et al. .................... | 382/170 |
| 7,742,649 B2 * | 6/2010 | Tabesh et al. ................. | 382/248 |
| 8,134,786 B2 * | 3/2012 | Taguchi et al. ............... | 359/726 |
| 2003/0113032 A1 * | 6/2003 | Wang et al. ................... | 382/275 |
| 2004/0114822 A1 * | 6/2004 | Tabesh et al. ................. | 382/248 |
| 2004/0126034 A1 * | 7/2004 | Yu et al. ........................ | 382/260 |
| 2004/0240725 A1 * | 12/2004 | Xu et al. ........................ | 382/154 |
| 2005/0074179 A1 * | 4/2005 | Wilensky ...................... | 382/254 |
| 2005/0135679 A1 * | 6/2005 | Yoon et al. .................... | 382/190 |
| 2006/0274956 A1 * | 12/2006 | Sohn et al. .................... | 382/238 |

(Continued)

FOREIGN PATENT DOCUMENTS

CN  101281651  10/2008

OTHER PUBLICATIONS

Loy, G., and Eklundh, J,. Detecting symmetry and symmetric constellations of features, 2006. In Proceedings of ECCV, p. 508-521.*

(Continued)

*Primary Examiner* — Claire X Wang
*Assistant Examiner* — Gandhi Thirugnanam
(74) *Attorney, Agent, or Firm* — Wolfe-SBMC

(57) ABSTRACT

A method, system, and computer-readable storage medium are disclosed for determining one or more symmetries in an image comprising a plurality of pixels. A symmetry value may be automatically determined for each of the plurality of pixels. The symmetry value may indicate the strength of one or more symmetries in the image for the respective pixel. The symmetry value may be stored for each of the pixels.

27 Claims, 5 Drawing Sheets

Automatically determine a symmetry value for each of a plurality of pixels
210

↓

Store the symmetry value for each of the pixels
220

U.S. PATENT DOCUMENTS

| | | | |
|---|---|---|---|
| 2007/0058879 A1* | 3/2007 | Cutler et al. | 382/254 |
| 2008/0021502 A1* | 1/2008 | Imielinska et al. | 607/1 |
| 2008/0069402 A1* | 3/2008 | Dhua et al. | 382/104 |
| 2008/0080790 A1* | 4/2008 | Hori et al. | 382/300 |
| 2008/0118113 A1* | 5/2008 | Jung et al. | 382/117 |
| 2008/0247660 A1* | 10/2008 | Zhang et al. | 382/254 |
| 2011/0025710 A1* | 2/2011 | Kennedy et al. | 345/629 |
| 2011/0091065 A1* | 4/2011 | Chandrashekar et al. | 382/100 |
| 2012/0134576 A1* | 5/2012 | Sharma et al. | 382/155 |

OTHER PUBLICATIONS

D. Lowe, "Distinctive Image Features from Scale-Invariant Keypoints,", 2004, Int'l J. Computer Vision, vol. 2, No. 60, p. 1-28.*

Gauch, "The intensity axis of symmetry and its application to imagesegmentation", 1993, IEEE Transactions on Pattern Analysis and Machine Intelligence vol. 15 No. 8. p. 753-770.*

Fukushima,"Use of non-uniform spatial blur for image comparison: Symmetry axis extraction",2005, Neural Networks 18 (1) (2005), pp. 23-32.*

Gareth Loy and Jan-Olof Eklundh, "Detecting Symmetry and Symmetric Constellation of Features," ECCV 2006, pp. 508-521, Springer-Verlag, Berlin, 2006.

Hagit Zabrodsky, Shmuel Peleg, and David Avnir, "Symmetry as a Continuous Feature," IEEE Transactions on Pattern Analysis and Machine Intelligence, vol. 17, No. 12, pp. 1154-1165, IEEE Computer Society, Washington, DC, Dec. 1995.

* cited by examiner

AUTOMATIC DETECTION AND MAPPING OF SYMMETRIES IN AN IMAGE

BACKGROUND

1. Field of the Invention

The present invention is directed to computer systems; and more particularly, it is directed to the processing of digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Raster graphics data (also referred to herein as bitmaps) may be stored and manipulated as a grid of individual picture elements called pixels. Suitable image editors may be used to modify pixels (e.g., values such as hue, brightness, saturation, transparency, etc.) on a pixel-by-pixel basis or as a group. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. A black and white bitmap may require less space (e.g., one bit per pixel). Raster graphics are often used for photographs and photo-realistic images.

Vector graphics data may be stored and manipulated as one or more geometric objects. The geometric primitives (e.g., points, lines, polygons, Bézier curves, and text characters) may be based upon mathematical equations to represent parts of digital images. Suitable image editors may be used to perform operations on these objects such as rotation, translation, stretching, skewing, changing depth order, and combining with other objects. Vector graphics data are often rasterized, or converted to raster graphics data, in the process of displaying the data on a display device or printing the data with a printer. While raster graphics may often lose apparent quality when scaled to a higher resolution, vector graphics may scale to the resolution of the device on which they are ultimately rendered. Therefore, vector graphics are often used for images that are sought to be device-independent, such as in typesetting and graphic design.

SUMMARY

Various embodiments of systems, methods, and computer-readable storage media are disclosed for automatic detection of one or more symmetries in a digital image comprising a plurality of pixels. According to one embodiment, a symmetry value may be automatically determined for each of the plurality of pixels. The symmetry value may indicate the strength of one or more symmetries in the image for the respective pixel. The symmetry value may be stored for each of the pixels. The individual symmetry values may be components of a symmetry map that is stored for the digital image on a per-pixel basis. According to one embodiment, suitable image editing operations such as image segmentation or image annotation may be performed on the image based on the stored symmetry values.

According to one embodiment, one or more interest points may be determined in the image by using a scale-invariant feature transform (SIFT). An adaptive SIFT descriptor may be used to permit the representation of interest points with various numbers of dimensions. For each interest point found using SIFT, a matching symmetric interest point may be determined. Each pair of matching interest points may vote for an axis of symmetry in the image, and a symmetry map for the image may be built that includes per-pixel symmetry values based on the one or more axes of symmetry in the image.

According to one embodiment, a hierarchical symmetry feature extraction may be performed on the image at various resolutions. For example, the original image, a down-sampled version of the image, and/or an up-sampled version of the image may be used as input. Axes of symmetry may be determined in each version of the image. The axes of symmetry in the various versions of the image may be combined to produce a symmetry map for the original image.

Figure 1:
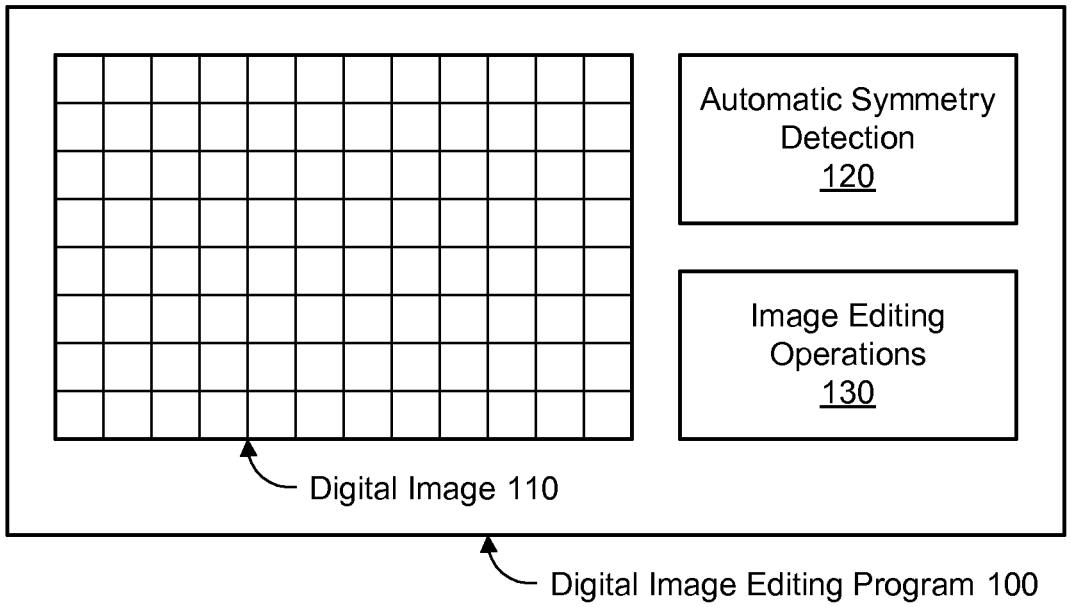
FIG. 1 is a block diagram illustrating an embodiment of a digital image editing program configured for automatic symmetry detection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents, and alternatives falling within the spirit and scope of the present invention as defined by the appended claims.

DETAILED DESCRIPTION OF EMBODIMENTS

Various embodiments may provide systems and methods for automatic detection of symmetry in a digital image. Symmetry may be detected for a plurality of pixels on a per-pixel basis, and a symmetry value may be determined and stored for each pixel. The symmetry detection may be based on local features (e.g., interest points) and may be refined with a global approach. Suitable image editing operations may be performed on the image based on the stored symmetry values.

Figure 8:
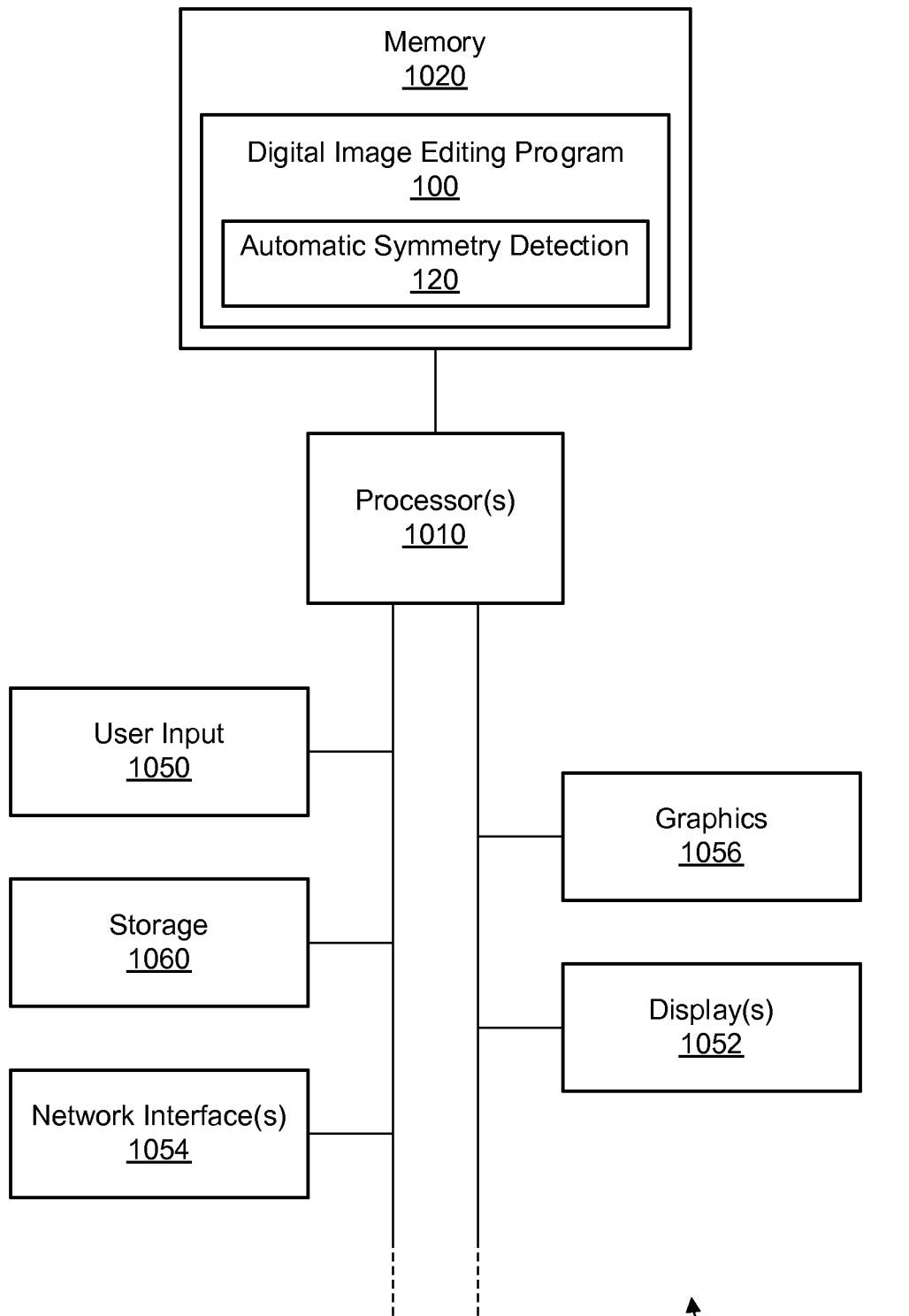
FIG. 8 is a block diagram illustrating constituent elements of a computer system that is configured to implement embodiments of the systems and methods for automatic symmetry detection.

FIG. 1 is a block diagram illustrating an embodiment of a digital image editing program configured for automatic symmetry detection. A digital image editing program 100, also referred to as an image editor, may comprise a plurality of image editing operations 130. In one embodiment, a suitable product such as Adobe Photoshop®, Adobe Illustrator®, or Adobe AfterEffects® (all available from Adobe Systems, Inc.) may be used as the image editor 100. A suitable computer system for executing the digital image editing program 100 is illustrated in FIG. 8. Turning back to FIG. 1, the image editing program 100 may be used to create and/or modify a digital image 110 comprising a plurality of pixels. The digital image 110 may comprise one or more layers, wherein each layer comprises a two-dimensional grid of pixels. The digital image 110 may comprise one frame in a sequence of frames of digital video. The image editing operations 130 may comprise various operations for modifying pixels and/or objects in the digital image 110 on an individual or collective basis.

Using an automatic symmetry detection feature 120, one or more symmetries (i.e., instances of symmetry) may be automatically detected in the image 110. In one embodiment, the one or more symmetries may comprise the same or different types of symmetry. For example, different types of symmetry may include bilateral symmetry, radial symmetry, periodic patterns, etc. In various embodiments, substantially any form of two-dimensional geometric symmetry (e.g., reflection symmetry, rotational symmetry, translational symmetry, etc.) may be detected by the automatic symmetry detection feature 120. In one embodiment, the automatic symmetry detection feature 120 may determine that there are substantially no symmetries in an image 110. In various embodiments, the automatic symmetry detection 120 may be provided to the digital image editing program 100 through an external "plug-in" module comprising program instructions and/or through program instructions built in to the digital image editing program 100. In another embodiment, the automatic symmetry detection 120 may be performed by a specialized set of program instructions that are executable in a manner substantially independent of the digital image editing program 100.

Figure 2:
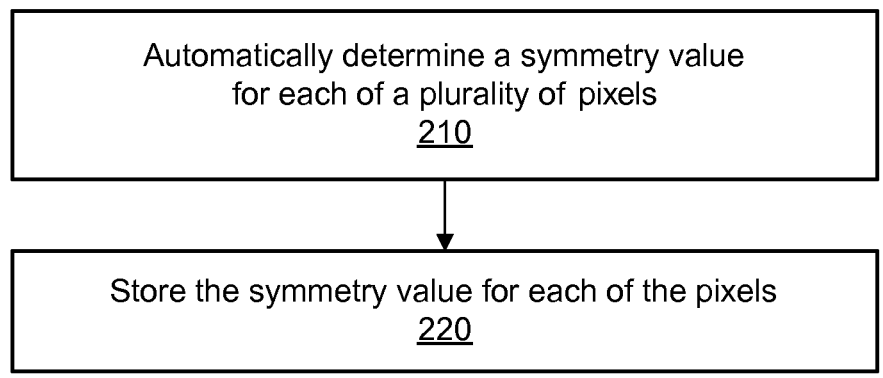
FIG. 2 is a flow diagram illustrating one embodiment of a method for automatically determining per-pixel symmetry values in an image.

FIG. 2 is a flow diagram illustrating one embodiment of a method for automatically determining per-pixel symmetry values in an image comprising a plurality of pixels. As shown in block 210, a symmetry value may be automatically determined for each of the plurality of pixels. The symmetry value may indicate a strength of one or more symmetries (i.e., instances of symmetry) in the image for the respective pixel. Determination of the symmetry values is discussed in greater detail below.

As shown in block 220, the symmetry value may be stored for each of the pixels. In one embodiment, the individual symmetry values may be components of a symmetry map that is stored as metadata for the digital image 110. In one embodiment, the symmetry values may be stored in an alpha channel having substantially the same dimensions as the other channels (e.g., individual channels for red, green, and blue) of the digital image 110. In one embodiment, the symmetry values may be stored per pixel in substantially the same manner as other features such as color or texture are stored per pixel.

Figure 3:
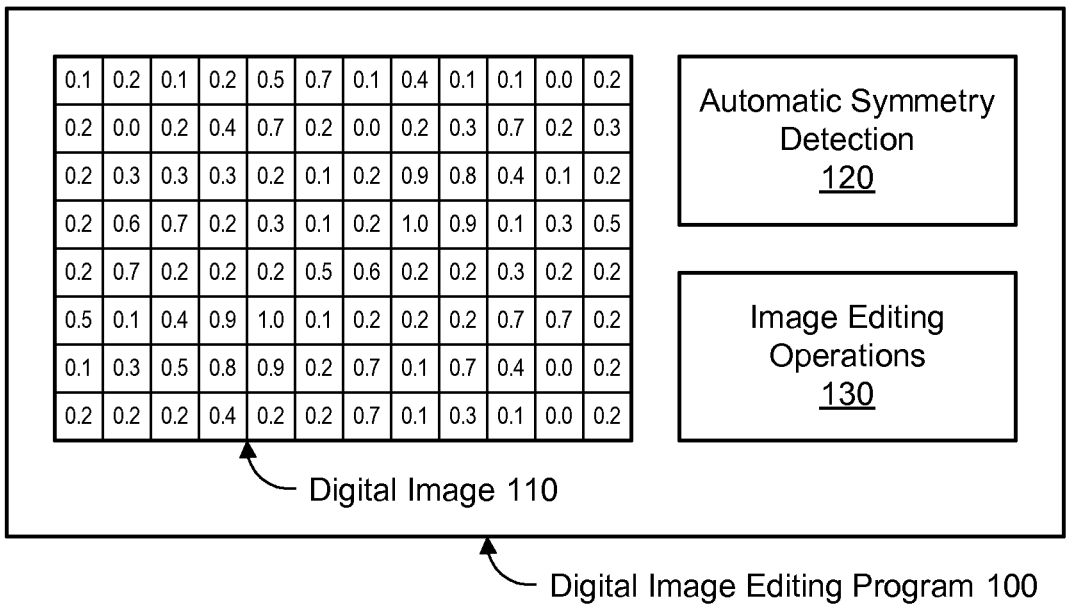
FIG. 3 is a block diagram illustrating an embodiment of a digital image editing program configured for automatic symmetry detection including per-pixel symmetry values.

FIG. 3 is a block diagram illustrating an embodiment of a digital image editing program configured for automatic symmetry detection including per-pixel symmetry values. In one embodiment, each symmetry value may range between a minimum symmetry value and a maximum symmetry value. For example, as shown in FIG. 3, the symmetry values may comprise floating-point values of a suitable precision between zero and one. By establishing symmetry as a per-pixel feature in this manner, suitable operations of the image editing operations 130 may be performed on the image 110 based on the symmetry values. In one embodiment, for example, the image editing operations 130 may comprise an operation to segment the image based on the symmetry values. In one embodiment, the image editing operations 130 may comprise an operation to annotate the image (e.g., by creating or modifying per-pixel or per-image metadata) based on the symmetry values. In one embodiment, the image editing operations 130 may comprise an operation to determine one or more image primitives in the image based on the symmetry values.

Figure 4:
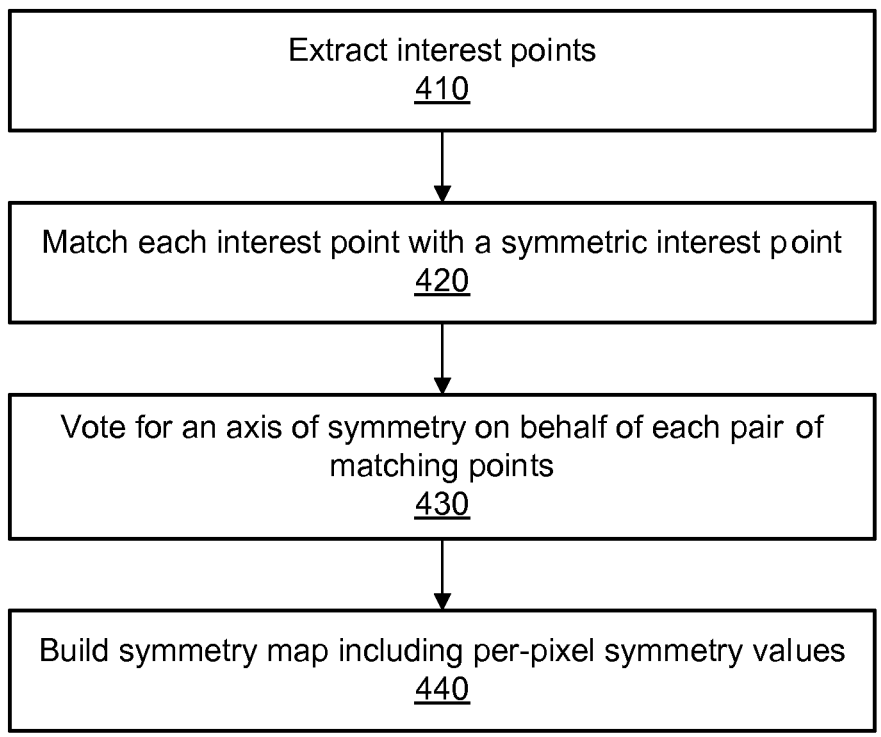
FIG. 4 is a flow diagram illustrating one embodiment of a method for automatically determining per-pixel symmetry values based on interest points in an image.

FIG. 4 is a flow diagram illustrating one embodiment of a method for automatically determining per-pixel symmetry values based on interest points in an image. Blocks 410, 420, 430, and 440 may represent a specific implementation of block 210 in one embodiment. In one embodiment, the method shown in FIG. 4 may be used to determine instances of reflection symmetry (also referred to herein as mirror symmetry or bilateral symmetry) in the image. As shown in block 410, one or more interest points in the image may be extracted. An interest point may be a location in the image where there is a significant variation with respect to an image feature. Determining the interest points in block 410 may therefore capture the local characteristics of one or more objects in the image.

In one embodiment, the interest points may be determined in block 410 by using a scale-invariant feature transform (SIFT). SIFT is a technique for extracting distinctive features from images. The features may be invariant to image scale, invariant to rotation, partially invariant to changing viewpoints, and partially invariant to change in illumination. Using SIFT, image data may be transformed into scale-invariant coordinates relative to local features. In one embodiment, the implementation of SIFT used in block 410 may be the implementation created by David Lowe, the originator of SIFT (e.g., as described in U.S. Pat. No. 6,711,293). To apply this SIFT technique, the original image may first be progressively Gaussian blurred with a in a band from 1 to 2, thereby resulting in a series of Gaussian blurred images (i.e., a scale-space produced by cascade filtering). The images may then be subtracted from their direct neighbors (by σ) to produce a new series of images (i.e., having a difference of Gaussians which approximate the Laplacian of the Gaussian). In one embodiment, major steps in the detection of the interest points may include scale-space extrema detection (e.g., by comparison of each pixel to its neighbors in a form of blob detection), interest point localization (e.g., by choosing interest points from the extrema in scale space), orientation assignment (e.g., determining histograms of gradient directions using bilinear interpolation for each interest point), and representation of each interest point using a SIFT descriptor.

An adaptive SIFT descriptor may be used to permit the representation of interest points with various numbers of dimensions. In one embodiment, for example, each SIFT descriptor may represent an interest point using a 512-dimensional vector. In other embodiments, each SIFT descriptor may comprise a 128-dimensional vector, a 32-dimensional vector, or any other vector of a suitable size. In one embodiment, larger SIFT descriptors may tend to reduce false positive matches.

In one embodiment, other techniques for determining interest points may be used in addition to or in place of the Lowe SIFT algorithm. As one example, a different implementation of SIFT may be used. As another example, the points along the edges of various objects in the image may be sampled to augment the SIFT interest points that are typically internal to objects. The number of interest points on object boundaries may also be increased by increasing the total number of SIFT points using the Lowe SIFT algorithm discussed above.

As shown in block 420, a matching symmetric interest point may be determined for each interest point found in block 410. Each interest point and matching symmetric interest point may comprise a matching interest point pair. In one embodiment, when the symmetry in question includes a reflection, the SIFT descriptor for each interest point may be flipped (e.g., transformed into a mirror image about a horizontal or vertical axis) to create a symmetric SIFT descriptor. The other pixels in the image may then be searched to determine which, if any, have a SIFT descriptor that matches the symmetric SIFT descriptor. In another embodiment, the image may be flipped, interest points may be extracted from the flipped image as described above, and the interest points in the flipped image may be compared to the interest points in the original image. The techniques used in block 420 may generate both valid matches and invalid matches (i.e., two points that are not actually symmetric). The valid matches may be identified in block 430.

Figure 5:
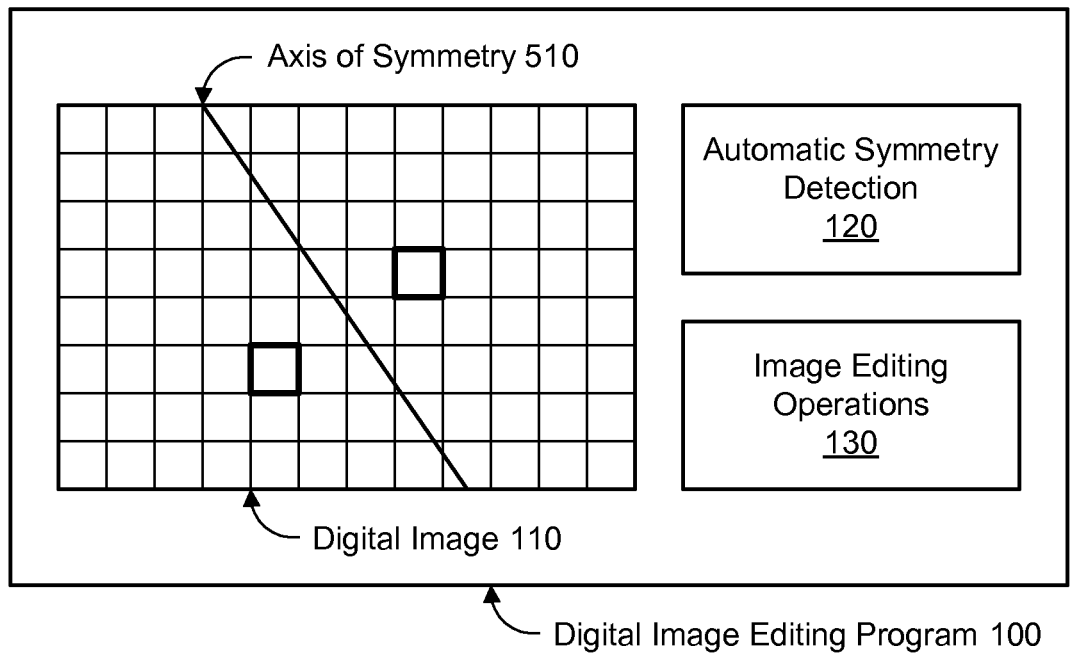
FIG. 5 is a block diagram illustrating an embodiment of a digital image editing program configured for automatic detection of an axis of symmetry.

As shown in block 430, each matching interest point pair found in block 420 may vote for an axis of symmetry when reflection symmetry is sought. For each matching interest point pair, an axis of symmetry may be computed as the perpendicular bisector of the two interest points in the pair. FIG. 5 is a block diagram illustrating an embodiment of a digital image editing program configured for automatic detection of an axis of symmetry 510 for reflection symmetry. In the example shown in FIG. 5, the estimated axis of symmetry 510 may be established for a pair of matching points as shown. In one embodiment, matched pairs having points that are close in distance (e.g., less than six pixels apart) may be discarded in block 430 to eliminate a potential source of error.

Figure 6:
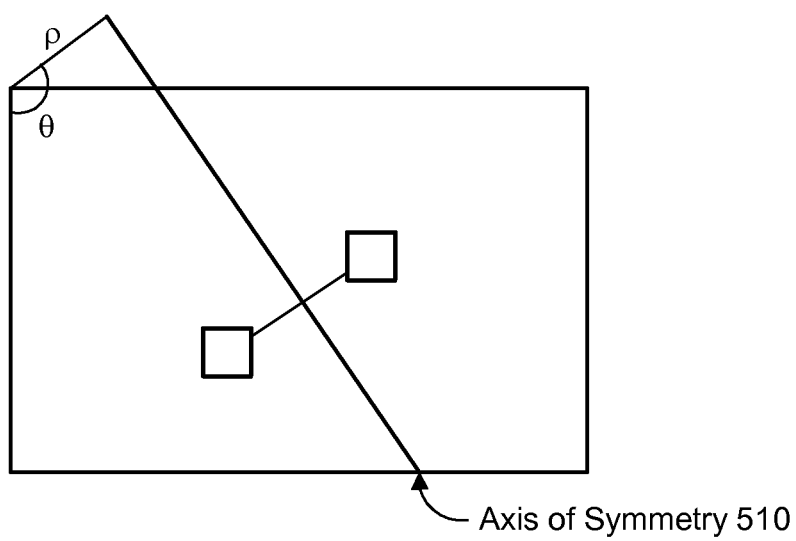
FIG. 6 is a block diagram further illustrating an axis of symmetry that is automatically determined according to one embodiment.

FIG. 6 is a block diagram further illustrating the axis of symmetry 510 according to one embodiment. A line perpendicular to the axis of symmetry 510 may be drawn from the origin. As shown in FIG. 6, the line may be described by the values ρ (rho) and θ (theta). For a pixel p(x1, y1) and its matching pixel p'(x2,y2), the neighboring pixels in diagonal directions p(x1+i, y1+j) and p'(x2+s, y2+t) (where i, j, s, and t are between [−1,1]) may be used to decide the range of uncertainty of rho and theta. In one embodiment, a Hough transform may be used to implement block 430. Each pair of matching SIFT points may cast a Gaussian distribution into the accumulator in Hough space, centered at (rho, theta), with the size of [range of rho, range of theta]. Thus, the error of the correct symmetry from these two interest points may be reduced. The accumulator in Hough space may include the rho and theta values for each pair of matching points. The peak(s) from the accumulator in Hough space may correspond to a potential axis or axes of symmetry. The rho and theta values of each peak may determine one or more axes of symmetry (i.e., perpendicular to the line of (rho, theta), and past the point (rho*sin(theta), rho*cos(theta)).

As shown in block 440, a symmetry map for the image may be built. The symmetry map may include per-pixel symmetry values for all or part of the pixels in the image, and the symmetry map may indicate the strength of the symmetry at each of these pixels. The symmetry map may be stored as discussed above with reference to block 220. Techniques for building the symmetry map are discussed in greater detail below.

Figure 7:
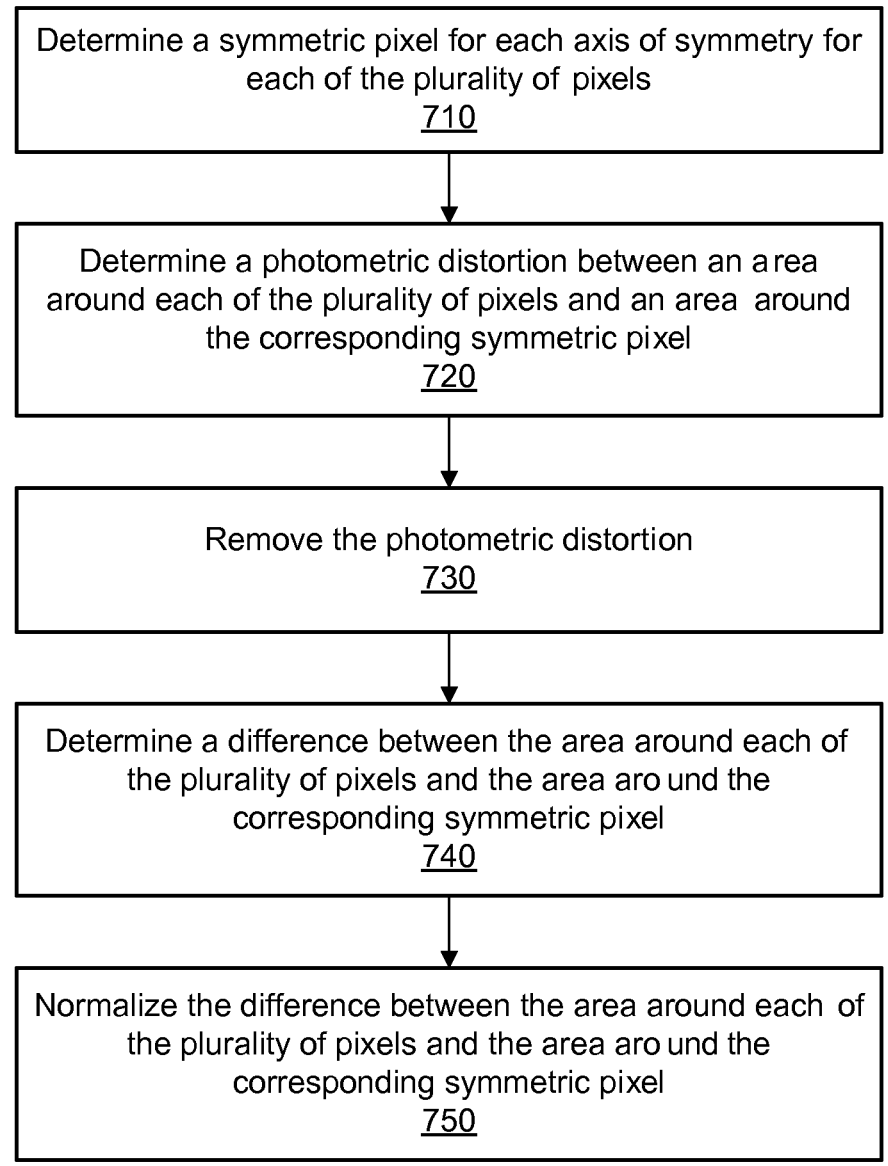
FIG. 7 is a flow diagram illustrating one embodiment of a method for building a symmetry map.

FIG. 7 is a flow diagram illustrating one embodiment of a method for building a symmetry map. In one embodiment, FIG. 7 may represent a specific implementation of block 440. In one embodiment, the method shown in FIG. 7 may be used to determine instances of reflection symmetry (also referred to herein as mirror symmetry or bilateral symmetry) in the image. As shown in block 710, a symmetric pixel may be determined for each axis of symmetry and for each of the plurality of pixels. As shown in block 720, a photometric distortion between an area (or block) around each of the plurality of pixels and an area (or block) around the corresponding symmetric pixel may be determined. For a matching pair p and p', the photometric distortion may be expressed as:

$$p'_i = a*p_i + b$$

As shown in block 730, the photometric distortion may be removed or minimized for each of the plurality of pixels. In one embodiment, Minimum Mean Square Error (MMSE) techniques may be used to minimize the photometric distortion with parameters (a, b). As shown in block 740, a difference between the area around each of the plurality of pixels and the area around the corresponding symmetric pixel may be determined as the difference of the area around p and p' with the photometric distortion removed. As shown in block 750, the difference between the area around each of the plurality of pixels and the area around the corresponding symmetric pixel may be normalized. In one embodiment, the difference may be normalized to the range of [0, 1] to describe the relative symmetry strength of the pixels in the image.

In one embodiment, pixels in a substantially uniform area (e.g., a clear patch of sky in a photograph) may be considered to have axes of symmetry in substantially any direction. Therefore, these pixels may not be considered for inclusion in the symmetry map or may be assigned the lowest symmetry value.

In one embodiment, the methods and systems discussed with reference to FIGS. 4 through 7 may be used to determine instances of reflection symmetry in an image. In other embodiments, similar techniques may be used to determine other forms of symmetry instead of or in addition to reflection symmetry. For example, variations of the technique illustrated in FIG. 4 may be used to determine rotational symmetry and/or periodic symmetry (also referred to as translation symmetry). When rotational symmetry or periodic symmetry is sought in an image, interest points may be extracted as shown in block 410. As discussed above, the interest points may be determined with a SIFT technique and represented by SIFT descriptors. As shown in block 420, each interest point may be matched with one or more symmetric interest points. In the case of rotational symmetry, for example, matching interest points may be present in groups of two or more around a center of rotation. The orientation of matching pairs may not be a constraint for rotational symmetry or period symmetry as it is for reflection symmetry.

Instead of determining one or more axes of symmetry as shown in block 430, a center of rotation and fundamental angle may be determined for rotational symmetry and a fundamental period may be determined for periodic symmetry. A Hough transform and accumulator may be used to determine these values in a manner similar to that which is described with reference to block 430. For example, a relative displacement of the positions of matching interest points may be accumulated when periodic symmetry is sought. Peaks at integer multiples of a fundamental period may then indicate the fundamental period of periodic symmetry in the image.

In one embodiment, the techniques discussed above may be performed as hierarchical symmetry feature extraction by using the original image, a down-sampled version of the image, and/or an up-sampled version of the image as input. If an image has symmetry, then the down-sampled and up-sampled versions of the same image should be symmetric in the same way. Performing the symmetry feature extraction techniques on the down-sampled and up-sampled versions may yield additional benefits. For example, performing the symmetry feature extraction process on the down-sampled version of the image may identify major symmetry, which is more likely to be the symmetry of the whole object. As another example, the up-sampled version of the image may have more matching points detected due to its larger size. The hierarchical symmetry feature extraction technique may identify major axes of symmetry where the original technique (i.e., using only the original image) may fail.

In one embodiment, the original image may be down-sampled to one-quarter of the original size and up-sampled to four times the original size. Symmetry may be detected in all three of the versions of the image using the techniques discussed above. The accumulators in Hough space for the three images may then be combined by adding them together. The overall peaks may correspond to the axis or axes of symmetry of the symmetric features in the image. Because the range of rho is proportional to the size of the image, the accumulators of original image and the down-sampled image may be up-sampled and interpolated to the size of the up-sampled image before being combined. The final peaks correspond to symmetries in the up-sampled image, and an appropriate scaling factor (e.g., [rho*0.5, theta]) may be used to find the axis or axes of symmetry in the image at its original size.

In various embodiments, different numbers of image versions (including one or more down-sampled versions, one or more up-sampled versions, and/or the original version) may be used in the hierarchical symmetry feature extraction. In various embodiments, different resolutions or sizes of the down-sampled and/or up-sampled versions (i.e., using various scaling factors) may be used in the hierarchical symmetry feature extraction. In various embodiments, the accumulators for the various image versions may be combined with equal weight or with differential weight.

In various embodiments, any of the operations shown in FIGS. 2, 4, and 7 may be performed automatically (i.e., without user intervention) and/or programmatically (i.e., by a computer according to a computer program). In various embodiments, any of the operations shown in FIGS. 2, 4, and 7 may be performed in different orders and combinations than that which is illustrated. In various embodiments, any of the techniques shown in FIGS. 2, 4, and 7 may be performed with additional operations or fewer operations than that which is illustrated.

FIG. 8 is a block diagram illustrating constituent elements of a computer system 1000 that is configured to implement embodiments of the systems and methods disclosed herein for per-pixel symmetry detection. The computer system 1000 may include one or more processors 1010 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1000, such as various versions of Unix, Linux, Windows™ from Microsoft Corporation, Mac OS™ from Apple Corporation, or any other operating system that enables the operation of software on a hardware platform. The processor(s) 1010 may be coupled to one or more of the other illustrated components, such as a memory 1020, by at least one communications bus.

In one embodiment, a graphics card or other graphics component 1056 may be coupled to the processor(s) 1010. The graphics component 1056 may comprise a graphics processing unit (GPU) and local video memory (e.g., VRAM) for efficiently performing specialized graphics tasks. Additionally, the computer system 1000 may include one or more displays 1052. In one embodiment, the display(s) 1052 may be coupled to the graphics card 1056 for display of data provided by the graphics card 1056.

Program instructions that may be executable by the processor(s) 1010 to implement aspects of the techniques described herein may be partly or fully resident within the memory 1020 at the computer system 1000 at any point in time. For example, the program instructions may comprise a digital image editing program 100 including automatic symmetry detection 120 as shown in FIGS. 1 and 2. The memory 1020 may be implemented using any appropriate medium such as any of various types of ROM or RAM (e.g., DRAM, SDRAM, RDRAM, SRAM, etc.), or combinations thereof. The program instructions may also be stored on a storage device 1060 accessible from the processor(s) 1010. Any of a variety of storage devices 1060 may be used to store the program instructions in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1060 may be coupled to the processor(s) 1010 through one or more storage or I/O interfaces. In some embodiments, the program instructions may be provided to the computer system 1000 via any suitable computer-readable storage medium including the memory 1020 and storage devices 1060 described above.

The computer system 1000 may also include one or more additional I/O interfaces, such as interfaces for one or more user input devices 1050. In addition, the computer system 1000 may include one or more network interfaces 1054 providing access to a network. It should be noted that one or more components of the computer system 1000 may be located remotely and accessed via the network. The digital image editing program 100 and/or automatic symmetry detection feature 120 may be implemented in various embodiments using any desired programming language, scripting language, or combination of programming languages and/or scripting languages, e.g., C, C++, C#, Java™, Perl, etc. As indicated by the ellipsis, the computer system 1000 may also include additional elements that are not shown. In other embodiments, the computer system 1000 may include fewer elements than that which is illustrated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for determining one or more symmetries in an image comprising a plurality of pixels, comprising:

performing by a computer:

automatically determining a symmetry value for each of the plurality of pixels in the image, wherein the symmetry value indicates a strength of one or more symmetries in the image for the respective pixel with respect to one or more other pixels in the image, and wherein automatically determining the symmetry value for each of the plurality of pixels in the image comprises:
  determining a symmetric pixel for an axis of symmetry for each of the plurality of pixels; and
  determining a respective difference between an area around each of the plurality of pixels and an area around the corresponding symmetric pixel, wherein the area around each of the plurality of pixels includes at least the respective pixel, and wherein the area around the corresponding symmetric pixel includes at least the corresponding symmetric pixel; and
  storing the symmetry value for each of the pixels in a symmetry map, wherein the symmetry map stores the symmetry value for each pixel in the image as a feature of the respective pixel, and wherein each symmetry value is dependent on the respective difference.

2. The method as recited in claim 1, wherein automatically determining the symmetry value for each of the plurality of pixels in the image comprises:
  determining one or more interest points in the image;
  determining a matching symmetric interest point for each interest point, wherein each interest point and matching symmetric interest point comprise a matching interest point pair; and
  voting for the axis of symmetry for each matching interest point pair.

3. The method as recited in claim 1, wherein automatically determining the symmetry value for each of the plurality of pixels in the image further comprises:
  determining a photometric distortion between the area around each of the plurality of pixels and the area around the corresponding symmetric pixel;
  removing the photometric distortion for each of the plurality of pixels;
  normalizing the difference between the area around each of the plurality of pixels and the area around the corresponding symmetric pixel.

4. The method as recited in claim 1, further comprising: segmenting the image based on the symmetry values.

5. The method as recited in claim 1, further comprising: annotating the image based on the symmetry values.

6. The method as recited in claim 1, further comprising: determining one or more image primitives in the image based on the symmetry values.

7. The method as recited in claim 1, wherein the one or more symmetries comprise a bilateral symmetry in at least a portion of the image.

8. The method as recited in claim 1, wherein the one or more symmetries comprise a radial symmetry in at least a portion of the image.

9. The method as recited in claim 1, wherein the one or more symmetries comprise a periodic pattern in at least a portion of the image.

10. The method as recited in claim 1, wherein automatically determining the symmetry value for each of the plurality of pixels in the image comprises:
  determining one or more axes of symmetry in the image;
  determining one or more axes of symmetry in a down-sampled version of the image;
  determining one or more axes of symmetry in an up-sampled version of the image; and
  combining the one or more axes of symmetry in the image, the one or more axes of symmetry in the down-sampled version of the image, and the one or more axes of symmetry in the up-sampled version of the image.

11. The method as recited in claim 1, wherein automatically determining the symmetry value for each of the plurality of pixels in the image comprises automatically determining the symmetry value for each of the plurality of pixels in one or more down-sampled versions of the image or one or more up-sampled versions of the image.

12. A non-transitory, computer-readable storage medium, comprising program instructions, wherein the program instructions are computer-executable to implement:
  determining a symmetry value for each of a plurality of pixels in an image, wherein the symmetry value indicates a strength of one or more symmetries in the image for the respective pixel with respect to one or more other pixels in the image, and wherein determining the symmetry value for each of the plurality of pixels in the image comprises:
    determining a symmetric pixel for an axis of symmetry for each of the plurality of pixels; and
    determining a respective difference between an area around each of the plurality of pixels and an area around the corresponding symmetric pixel, wherein the area around each of the plurality of pixels includes at least the respective pixel, and wherein the area around the corresponding symmetric pixel includes at least the corresponding symmetric pixel; and
  storing the symmetry value for each of the pixels in a symmetry map, wherein the symmetry map stores the symmetry value for each pixel in the image as a feature of the respective pixel, and wherein each symmetry value is dependent on the respective difference.

13. The non-transitory, computer-readable storage medium as recited in claim 12, wherein automatically determining the symmetry value for each of the plurality of pixels in the image comprises:
  determining one or more interest points in the image;
  determining a matching symmetric interest point for each interest point, wherein each interest point and matching symmetric interest point comprise a matching interest point pair; and
  voting for the axis of symmetry for each matching interest point pair.

14. The non-transitory, computer-readable storage medium as recited in claim 12, wherein automatically determining the symmetry value for each of the plurality of pixels in the image further comprises:
  determining a photometric distortion between the area around each of the plurality of pixels and the area around the corresponding symmetric pixel;
  removing the photometric distortion for each of the plurality of pixels;
  normalizing the difference between the area around each of the plurality of pixels and the area around the corresponding symmetric pixel.

15. The non-transitory, computer-readable storage medium as recited in claim 12, wherein the program instructions are further computer-executable to implement:
  segmenting the image based on the symmetry values.

16. The non-transitory, computer-readable storage medium as recited in claim 12, wherein the program instructions are further computer-executable to implement:
  annotating the image based on the symmetry values.

17. The non-transitory, computer-readable storage medium as recited in claim 12, wherein the program instructions are further computer-executable to implement:
  determining one or more image primitives in the image based on the symmetry values.

18. The non-transitory, computer-readable storage medium as recited in claim 12, wherein automatically determining the symmetry value for each of the plurality of pixels in the image comprises:
   determining one or more axes of symmetry in the image;
   determining one or more axes of symmetry in a down-sampled version of the image;
   determining one or more axes of symmetry in an up-sampled version of the image; and
   combining the one or more axes of symmetry in the image, the one or more axes of symmetry in the down-sampled version of the image, and the one or more axes of symmetry in the up-sampled version of the image.

19. The non-transitory, computer-readable storage medium as recited in claim 12, wherein automatically determining the symmetry value for each of the plurality of pixels in the image comprises automatically determining the symmetry value for each of the plurality of pixels in one or more down-sampled versions of the image or one or more up-sampled versions of the image.

20. A system, comprising:
   at least one processor;
   a memory coupled to the at least one processor, wherein the memory is configured to store program instructions executable by the at least one processor to:
      determine a symmetry value for each of a plurality of pixels in an image, wherein the symmetry value indicates a strength of one or more symmetries in the image for the respective pixel with respect to one or more other pixels in the image, and wherein, in determining the symmetry value for each of the plurality of pixels in the image, the program instructions are executable by the at least one processor to:
         determine a symmetric pixel for an axis of symmetry for each of the plurality of pixels; and
         determine a respective difference between an area around each of the plurality of pixels and an area around the corresponding symmetric pixel, wherein the area around each of the plurality of pixels includes at least the respective pixel, and wherein the area around the corresponding symmetric pixel includes at least the corresponding symmetric pixel; and
      store the symmetry value for each of the pixels in a symmetry map, wherein the symmetry map stores the symmetry value for each pixel in the image as a feature of the respective pixel, and wherein each symmetry value is dependent on the respective difference.

21. The system as recited in claim 20, wherein, in automatically determining the symmetry value for each of the plurality of pixels in the image, the program instructions are further executable by the at least one processor to:
   determine one or more interest points in the image;
   determine a matching symmetric interest point for each interest point, wherein each interest point and matching symmetric interest point comprise a matching interest point pair; and
   vote for the axis of symmetry for each matching interest point pair.

22. The system as recited in claim 20, wherein, in automatically determining the symmetry value for each of the plurality of pixels in the image, the program instructions are further executable by the at least one processor to:
   determine a photometric distortion between the area around each of the plurality of pixels and the area around the corresponding symmetric pixel;
   remove the photometric distortion for each of the plurality of pixels;
   normalize the difference between the area around each of the plurality of pixels and the area around the corresponding symmetric pixel.

23. The system as recited in claim 20, wherein the program instructions are further executable by the at least one processor to:
   segment the image based on the symmetry values.

24. The system as recited in claim 20, wherein the program instructions are further executable by the at least one processor to:
   annotate the image based on the symmetry values.

25. The system as recited in claim 20, wherein the program instructions are further executable by the at least one processor to:
   determine one or more image primitives in the image based on the symmetry values.

26. The system as recited in claim 20, wherein, in automatically determining the symmetry value for each of the plurality of pixels in the image, the program instructions are further executable by the at least one processor to:
   determine one or more axes of symmetry in the image;
   determine one or more axes of symmetry in a down-sampled version of the image;
   determine one or more axes of symmetry in an up-sampled version of the image; and
   combine the one or more axes of symmetry in the image, the one or more axes of symmetry in the down-sampled version of the image, and the one or more axes of symmetry in the up-sampled version of the image.

27. The system as recited in claim 20, wherein, in automatically determining the symmetry value for each of the plurality of pixels in the image, the program instructions are further executable by the at least one processor to:
   automatically determine the symmetry value for each of the plurality of pixels in one or more down-sampled versions of the image or one or more up-sampled versions of the image.

* * * * *